United States Patent [19]

Knudsen et al.

[11] Patent Number: 5,332,708
[45] Date of Patent: * Jul. 26, 1994

[54] CATALYST COMPOSITIONS AND CATALYTIC PROCESSES

[75] Inventors: Ronald D. Knudsen, Bartlesville; Gil R. Hawley, Dewey; Margie F. Jackson, Ochelata, all of Okla.

[73] Assignee: Phillips Petroleum Company, Bartlesville, Okla.

[*] Notice: The portion of the term of this patent subsequent to Mar. 30, 2010 has been disclaimed.

[21] Appl. No.: 979,989

[22] Filed: Nov. 23, 1992

[51] Int. Cl.$^5$ ............... B01J 31/00; B01J 29/04; B01J 21/16
[52] U.S. Cl. ................... 502/154; 502/62; 502/80; 502/155; 502/167
[58] Field of Search ............ 502/62, 80, 154, 155, 502/167

[56] References Cited

U.S. PATENT DOCUMENTS

| | | |
|---|---|---|
| 3,100,764 | 8/1963 | Jezl et al. . |
| 3,534,006 | 10/1970 | Kamaishi et al. . |
| 3,620,981 | 11/1971 | Magoon et al. . |
| 3,637,636 | 1/1972 | Bauer et al. . |
| 3,644,564 | 2/1972 | Zwet et al. . |
| 3,647,915 | 3/1972 | Bauer et al. . |
| 3,661,803 | 5/1972 | Bauer et al. . |
| 3,686,159 | 8/1972 | Bauer et al. . |
| 3,725,306 | 4/1973 | Yoo . |
| 3,904,550 | 9/1975 | Pine . |
| 4,024,202 | 5/1977 | Burnham . |
| 4,233,184 | 11/1980 | Cull . |
| 4,364,842 | 12/1982 | McDaniel et al. . |
| 4,364,854 | 12/1982 | McDaniel et al. . |
| 4,364,855 | 12/1982 | McDaniel et al. . |
| 4,482,640 | 11/1984 | Knudsen et al. . |
| 4,487,847 | 12/1984 | Knudsen . |
| 4,628,138 | 12/1986 | Barnett et al. . |
| 4,698,403 | 10/1987 | Klabunde . |
| 4,716,205 | 12/1987 | Klabunde . |
| 4,786,714 | 11/1988 | Drent . |
| 5,198,512 | 3/1993 | Jackson et al. ......... 502/62 X |

Primary Examiner—Helen M. S. Sneed
Assistant Examiner—E. D. Irzinski
Attorney, Agent, or Firm—Carl D. Corvin

[57] ABSTRACT

Catalytic compositions and catalytic processes are provided. The catalytic compositions are produced by the process that comprises contacting an organonickel compound with a cyclicazacarbyl compound. Optionally, one or more catalytic promoters can be present in the catalytic compositions. Additionally, one or more olefins can be contacted with one or more of these catalytic compositions to form oligomerization products and/or polymerization products.

24 Claims, No Drawings

CATALYST COMPOSITIONS AND CATALYTIC PROCESSES

BACKGROUND OF THE INVENTION

This invention is related to the field of catalytic compositions and catalytic processes.

Various catalytic compositions and catalytic processes are known in the art. For example, there are several catalytic compositions and several catalytic processes that can oligomerize ethylene into a higher molecular weight olefin. As another example, there are several catalytic compositions and several catalytic processes that can polymerize ethylene into a polymer. However no one catalytic composition or catalytic process can produce all the products needed to meet consumer demands. Therefore, research is constantly being conducted to find new and/or improved catalytic compositions and catalytic processes.

SUMMARY OF THE INVENTION

It is an object of this invention to provide catalytic compositions.

It is another object of this invention to provide catalytic processes.

It is still another object of this invention to provide catalytic compositions that are useful for oligomerizing olefins.

It is still another object of this invention to provide catalytic processes that are useful for oligomerizing olefins.

It is still another object of this invention to provide catalytic compositions that are useful for polymerizing olefins.

It is still another object of this invention to provide catalytic processes that are useful for polymerizing olefins.

It is still another object of this invention to provide catalytic compositions that are useful for oligomerizing, co-oligomerizing, polymerizing, and/or copolymerizing, ethylene with either itself or another olefin.

It is still another object of this invention to provide catalytic processes that are useful for oligomerizing, co-oligomerizing, polymerizing, and/or copolymerizing, ethylene with either itself or another olefin.

In accordance with this invention catalytic compositions are provided. These catalytic compositions are produced by the process that comprises (or optionally consists essentially of, or consists of) contacting an organonickel compound with a cyclicazacarbyl compound. Optionally, one or more catalytic promoters can be present in these catalytic compositions. Additionally, one or more olefins can be contacted with one or more of these catalytic compositions to form oligomerization products and/or polymerization products.

These catalytic compositions can be produced without any compound, reactant, element, step, parameter, or condition not mentioned herein.

These objects and other features, aspects, and advantages of the invention will become better understood with reference to the following description and claims.

DETAILED DESCRIPTION OF THE INVENTION

The organonickel compounds useful in this invention should have the following characteristics. The nickel component of the organonickel compound should be in the zero valence state or able to be reduced to the zero valence state. The nickel in the organonickel compound is preferably bonded to the organic component of the organonickel at the coordination sites.

The organic component of the organonickel compound should have some unsaturation in its molecular structure. Preferably, it should have from about 2 to about 5 carbon-carbon double bonds. However, it is more preferred that the organic component have 3 or 4 carbon-carbon double bonds. The organic component of the organonickel compound should be either a hydrocarbyl or a heterohydrocarbyl. That is, it should either be a hydrocarbyl composed of hydrogen and carbon, or it should be a heterohydrocarbyl composed of hydrogen, carbon, and heteroatoms. However, when the organic component is a heterohydrocarbyl then it is preferred that it contain no amine [—$N(R^3)_2$], phosphine [—$P(R^3)_2$], arsine [—$As(R^3)_2$], or hydroxylamine [—NHOH], groups in its molecular structure. For the purposes of this specification each $R^3$ is independently selected from the group consisting of hydrogen and hydrocarbyls. In any case, the hydrocarbyl, or heterohydrocarbyl should have from 2 to about 30, and preferably from 2 to about 20 carbon atoms in its molecular structure. Suitable examples of organonickel compounds include, but are not limited to, cyclododecatriene nickel, triethylene nickel, bis(1,5-cyclooctadiene) nickel, and mixtures of two or more said organonickel compounds. Presently preferred is bis(1,5-cyclooctadiene) nickel.

The cyclicazacarbyl compounds useful in this invention should have the following characteristics. The cyclicazacarbyl compound can either be monocyclic, that is having only one ring, or it can be polycyclic, that is having more than one ring. If the cyclicazacarbyl is a monocyclicazacarbyl, then at least one nitrogen should be present in the ring structure with the rest of the ring positions being taken by carbon atoms. It is preferred that the cyclicazacarbyl compound have a "proton donating capable group" attached to the ring structure. It is preferred that this "proton donating capable group" be attached to the ring as close as possible to a nitrogen atom. Suitable examples of "proton donating capable groups" are —$R^1(OH)_x$, —$R^1(COOH)_x$, —$R^1(SOH)_x$, —$R^1(SOOH)_x$—$R^1(SO_2OH)_x$; wherein $R^1$ is a hydrocarbyl or heterohydrocarbyl, preferably having from zero to about 10, more preferably from zero to about 6 carbon atoms in its molecular structure; and wherein x is an integer greater than zero, preferably from 1 to about 21; provided that when $R^1$ is a heterohydrocarbyl then it is preferred that it contain no amine [—$N(R^3)_2$], phosphine [—$N(R^3)_2$], arsine [—$As(R^3)_2$], or hydroxylamine [—NHOH] groups in its molecular structure.

Suitable examples of cyclicazacarbyl compounds useful in this invention can be illustrated by the following structures:

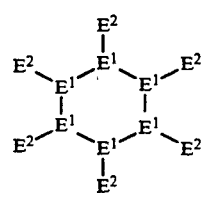

Structure 1A

-continued

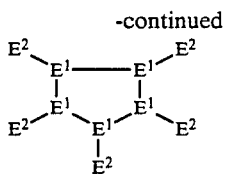
Structure 1B wherein $E^1$ is carbon or nitrogen, provided that at least one $E^1$ in at least one ring is nitrogen, and wherein at least one $E^2$ is selected from the group consisting of —$R^1(OH)_x$, —$R^1(COOH)_x$, —$R^1(SOH)_x$, —$R^1(SOOH)_x$, —$R^1(SO_2OH)_x$,

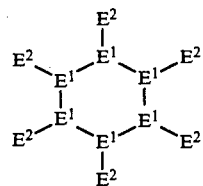

and

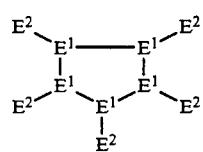

wherein $R^1$, x, $E^1$, and $E^2$ are defined as above; the remaining $E^2$ groups, if any, being selected from the group consisting of hydrogen, hydrocarbyls and heterohydrocarbyls having from 1 to 10 carbon atoms, and wherein said heterohydrocarbyl has from 1 to 10 heteroatoms, provided that when the remaining $E^2$ group is a heterohydrocarbyl then it is preferred that it contain no amine [—$N(R^3)_2$], phosphine [—$P(R^3)_2$], arsine [—$As(R^3)_2$], or hydroxylamine [—NHOH] groups in its molecular structure.

More specific examples of cyclicazacarbyl compounds useful in this invention can be illustrated by the following structures: Structure 2A1: monocyclic/monoaza/pentacarbyl compounds of the formula

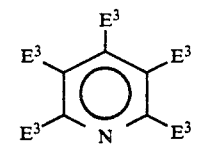

where $E^3$ is defined as $E^2$, except $E^3$ is not Structure 1A or Structure 1B.

Structure 2A2: monocyclic/monoaza/pentacarbyl compounds of the formula

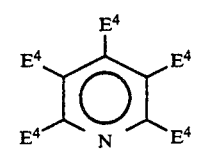

where each $E^4$ is independently selected from the group consisting of hydrogen, alkyl, or (—COOH).

Structure 2A3: polycyclic/monoaza/pentacarbyl compounds of the formula:

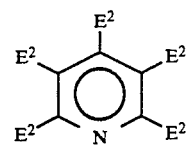

where $E^2$ is defined as above.

Structure 2B: monocyclic/monoaza/pentacarbyl oxide or polycylic/monoaza/pentacarbyl oxide compounds of the formula

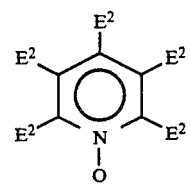

where $E^2$ is defined as above.

Structure 2C: monocyclic/diaza/tetracarbyl or polycylic/diaza/tetracarbyl compounds of the formula

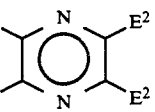
Structure 2C1

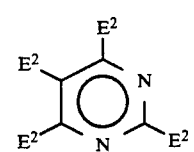
Structure 2C2

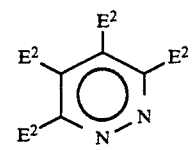
Structure 2C3 where $E^2$ is defined as above.

Structure 2D: monocyclic/monoaza/tetracarbyl or polycyclic/monoaza/tetracarbyl compounds of the formula

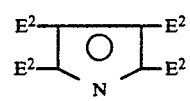

where $E^2$ is defined as above.

Structure 2E: (fused-dicyclic/monoaza/pentacarbyl) benzo compounds of the formula

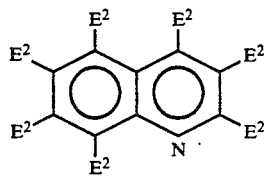

where $E^2$ is defined as above.

Structure 2F: dicyclic/diaza/dipentacarbyl compounds of the formula

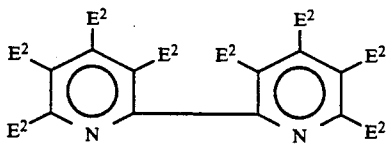

where $E^2$ is defined as above.

In general terms structures 2A1, 2A2, 2A3, 2B, 2E, and 2F can be described and defined as pyridine compounds. Additionally, structure 2C1 can be described and defined as a pyrazine compound; structure 2C2 can be described and defined as a pyrimidine compound; and structure 2C3 can be described and defined as a pyridazine compound. Finally, structure 2D can be described and defined as a pyrrole compound.

Specific examples of cyclicazacarbyl compounds useful in this invention include, but are not limited to, the following:

(AA) Representatives of structures 2A1 and/or 2A2 are
pyridine-2-carboxylic acid;
pyridine-3-carboxylic acid;
pyridine-4-carboxylic acid;
2,6-dihydroxypyridine-4-carboxylic acid;
2-hydroxypyridine-3-carboxylic acid;
4-hydroxypyridine-3-carboxylic acid;
6-hydroxypyridine-3-carboxylic acid;
3-hydroxy-5(hydroxymethyl)-2-methylpyridine-4-carboxylic acid;
5-hydroxy-4(hydroxymethyl)-6-methylpyridine-3-carboxylic acid;
pyridine-2,3-dicarboxylic acid;
pyridine-2,4-dicarboxylic acid;
pyridine-2,5-dicarboxylic acid;
pyridine-2,6-dicarboxylic acid;
pyridine-3,4-dicarboxylic acid;
pyridine-3,5-dicarboxylic acid;
5-methoxy-6-methylpyridine-3,4-dicarboxylic acid;
6-methylpyridine-2,4-dicarboxylic acid;
pyridine-2,3,4,5-tetracarboxylic acid;
pyridine-2,3,4,6-tetracarboxylic acid;
pyridine-2,3,5,6-tetracarboxylic acid;
pyridine-2,3,4-tricarboxylic acid;
pyridine-2,3,5-tricarboxylic acid;
pyridine-2,4,5-tricarboxylic acid;
pyridine-2,4,6-tricarboxylic acid;
pyridine-3,4,5-tricarboxylic acid;
pyridine-2-sulfonic acid;
pyridine-3-sulfonic acid;
pyridine-4-sulfonic acid;
2,6-dihydroxypyridine-4-sulfonic acid;
2-hydroxypyridine-3-sulfonic acid;
4-hydroxypyridine-3-sulfonic acid;
6-hydroxypyridine-3-sulfonic acid;
3-hydroxy-5(hydroxymethyl)-2-metbylpyridine-4-sulfonic acid;
5-hydroxy-4(hydroxymethyl)-6-methylpyridine-3-sulfonic acid;
pyridine-2,3-disulfonic acid;
pyridine-2,4-disulfonic acid;
pyridine-2,5-disulfonic acid;
pyridine-2,6-disulfonic acid;
pyridine-3,4-disulfonic acid;
pyridine-3,5-disulfonic acid;
5-methoxy-6-methylpyridine-3,4-disulfonic acid;
6-methylpyridine-2,4-disulfonic acid;
pyridine-2,3,4,5-tetrasulfonic acid;
pyridine-2,3,4,6-tetrasulfonic acid;
pyridine-2,3,5,6-tetrasulfonic acid;
pyridine-2,3,4-trisulfonic acid;
pyridine-2,3,5-trisulfonic acid;
pyridine-2,4,5-trisulfonic acid;
pyridine-2,4,6-trisulfonic acid;
pyridine-3,4,5-trisulfonic acid;
pyridine-2-ethylsulfonic acid;
pyridine-3-ethylsulfonic acid;
pyridine-4-ethylsulfonic acid;
2,6-dihydroxypyridine-4-ethylsulfonic acid;
2-hydroxypyridine-3-ethylsulfonic acid;
4-hydroxypyridine-3-ethylsulfonic acid;
6-hydroxypyridine-3-ethylsulfonic acid;
3-hydroxy-5(hydroxymethyl)-2-methylpyridine-4-ethylsulfonic acid;
5-hydroxy-4(hydroxymethyl)-6-methylpyridine-3-ethylsulfonic acid;
pyridine-2,3-diethylsulfonic acid;
pyridine-2,4-diethylsulfonic acid;
pyridine-2,5-diethylsulfonic acid;
pyridine-2,6-diethylsulfonic acid;
pyridine-3,4-diethylsulfonic acid;
pyridine-3,5-diethylsulfonic acid;
5-methoxy-6-methylpyridine-3,4-diethylsulfonic acid;
6-methylpyridine-2,4-diethylsulfonic acid;
pyridine-2,3,4,5-tetraethylsulfonic acid;
pyridine-2,3,4,6-tetraethylsulfonic acid;
pyridine-2,3,5,6-tetraethylsulfonic acid;
pyridine-2,3,4-triethylsulfonic acid;
pyridine-2,3,5-triethylsulfonic acid;
pyridine-2,4,5-triethylsulfonic acid;
pyridine-2,4,6-triethylsulfonic acid;
pyridine-3,4,5-triethylsulfonic acid;

(BB) Representatives of structure 2B are
pyridine-2-carboxylic acid-1-oxide;
pyridine-3-carboxylic acid-1-oxide;
pyridine-4-carboxylic acid-1-oxide;
2,6-dihydroxypyridine-4-carboxylic acid-1-oxide;
2-hydroxypyridine-3-carboxylic acid-1-oxide;
4-hydroxypyridine-3-carboxylic acid-1-oxide;
6-hydroxypyridine-3-carboxylic acid-1-oxide;
3-hydroxy-5(hydroxymethyl)-2-methylpyridine-4-carboxylic acid-1-oxide;
5-hydroxy-4(hydroxymethyl)-6-methylpyridine-3-carboxylic acid-1-oxide;
pyridine-2,3-dicarboxylic acid-1-oxide;
pyridine-2,4-dicarboxylic acid-1-oxide;
pyridine-2,5-dicarboxylic acid-1-oxide;
pyridine-2,6-dicarboxylic acid-1-oxide;
pyridine-3,4-dicarboxylic acid-1-oxide;
pyridine-3,5-dicarboxylic acid-1-oxide;
5-methoxy-6-methylpyridine-3,4-dicarboxylic acid-1-oxide;
6-methylpyridine-2,4-dicarboxylic acid-1-oxide;
pyridine-2,3,4,5-tetracarboxylic acid-1-oxide;
pyridine-2,3,4,6-tetracarboxylic acid-1-oxide;
pyridine-2,3,5,6-tetracarboxylic acid-1-oxide;
pyridine-2,3,4-tricarboxylic acid-1-oxide;
pyridine-2,3,5-tricarboxylic acid-1-oxide;
pyridine-2,4,5-tricarboxylic acid-1-oxide;
pyridine-2,4,6-tricarboxylic acid-1-oxide;
pyridine-3,4,5-tricarboxylic acid-1-oxide;

(CC) Representatives of structure 2C are
pyrazine-2-carboxylic acid;
pyrazine-2,3-dicarboxylic acid;
pyrazine-2,3,5,6-tetracarboxylic acid;
pyrimidine-2-carboxylic acid;

pyrimidine-2,4-dicarboxylic acid;
pyrimidine-2,4,6-tricarboxylic acid;
pyrimidine-2,4,5,6-tetracarboxylic acid;
pyridazine-3-carboxylic acid;
pyridazine-3,6-dicarboxylic acid;
pyridazine-4,5-dicarboxylic acid;
pyridazine-3,4,5,6-tetracarboxylic acid;
(DD) Representatives of structure 2D are
pyrrole-2-carboxylic acid;
pyrrole-3-carboxylic acid;
pyrrole-2,4-dicarboxylic acid;
pyrrole-2,5-dicarboxylic acid;
pyrrole-2,3,4,5-tetracarboxylic acid;
(EE) Representatives of structure 2E are
quinoline-2-carboxylic acid;
quinoline-3-carboxylic acid;
quinoline-4-carboxylic acid;
quinoline-5-carboxylic acid;
quinoline-6-carboxylic acid;
quinoline-7-carboxylic acid;
quinoline-8-carboxylic acid;
quinoline-2,3,4,5,6,7,8-heptacarboxylic acid;
(FF) A Representative of structure 2F is
2,2'dipyridyl;
(GG) Representatives of structure 1A are
2,3'dipyridyl;
2,4'dipyridyl;
4,4'dipyridyl;
2,2'dipyridyl ketone;
(HH) Representatives of structure 2B are
benzopyrrole-2-carboxylic acid;
benzopyrrole-3-carboxylic acid;
benzopyrrole-2,4-dicarboxylic acid.
Presently preferred compounds are:
pyridine-2-carboxylic acid;
pyridine-3-carboxylic acid;
pyridine-4-carboxylic acid;
pyridine-2,3-dicarboxylic acid;
pyridine-2,4-dicarboxylic acid;
pyridine-2,5-dicarboxylic acid;
pyridine-2,6-dicarboxylic acid;
pyridine-3,4-dicarboxylic acid;
pyridine-3,5-dicarboxylic acid;
pyridine-2-ethylsulfonic acid;
pyridine-2-carboxylic acid 1-oxide;
2,2'dipyridyl;
pyrazine-2-carboxylic acid;
pyrrole-2-carboxylic acid;
quinoline-2-carboxylic acid;
and mixtures of two or more said cyclicazacarbyl compounds.

The molar ratio of cyclicazacarbyl compound to nickel should be in the range of about 0.001 to about 100,000. It is preferred however that the molar ratio be from about 0.01 to about 10,000; it is most preferred however that the molar ratio be from 0.1 to 1,000.

The organonickel compound and the cyclicazacarbyl compound can be contacted in any manner known in the art. For example, the organonickel compound and the cyclicazacarbyl compound could be added to stirred tank reactor where they could be heated and intimately contacted together.

Optionally, a catalytic promoter can be present in the catalytic composition. Suitable examples of catalytic promoters include, but are not limited to, silica, silica-titania, clay, alumina, fluoridated alumina, silicated alumina, aluminum phosphate, and mixtures of two or more of these catalytic promoters. These catalytic promoters can greatly affect the results of any catalytic process using them.

In one embodiment the catalytic promoter is a clay compound. General classes of clay compounds useful in this invention are aluminum silicates, magnesium silicates, or aluminum-magnesium silicates. Examples of suitable clay compounds useful in this invention include, but are not limited to:
(1) attapulgite, an aluminum-magnesium silicate.
(2) bentonire, an aluminum silicate.
(3) halloysite, an aluminum silicate.
(4) hectorite, a magnesium silicate.
(5) kaolinite, an aluminum silicate.
(6) montmorillonite, an aluminum silicate.
(7) pyrophylite, an aluminum silicate.
(8) sepiolite, a magnesium silicate.
(9) talc, a magnesium silicate.
(10) vermiculite, an aluminum-magnesium silicate.

Particularly preferred catalytic promoters are the magnesium silicates and aluminum silicates. Most preferred is bentonire and sepiolite.

It is preferred that the clay compound be conditioned prior to use. This conditioning comprises subjecting the clay compound to a conditioning temperature in the range of from about 200° to about 800° C., preferably about 300° to about 700° C., and most preferably 400° to 600° C. The clay compound should be subjected to this conditioning temperature for a period of about 5 minutes to about 50 hours, preferably about 30 minutes to about 25 hours, and most preferably 1 hour to 10 hours.

In another embodiment the catalytic promoter is a silicated alumina gel. The silicated alumina gel is prepared by mixing an acidified slurry of boehmite or aluminum oxide hydroxide, AlO(OH), with a silicate solution followed by the addition of a base suitable for inducing the formation of a silicated alumina gel comprising silica. The silicated alumina gel is recovered and is utilized as a catalytic promoter.

The acidified slurry of boehmite can be prepared by mixing with a suitable solvent, by any suitable means known in the art, a boehmite material that is reduced in size to form a suitably sized fine powder for forming a slurry. It is generally desirable that the solvent used in preparing the acidified slurry of boehmite be water and that the amount of starting boehmite material be present in the slurry in an amount in the range of from about 10 grams boehmite to about 200 grams boehmite per 1000 grams water. However, it is possible, if the conditions warrant, for the weight ratio of boehmite to water in the boehmite slurry to exceed 200 grams boehmite per 1000 grams water. A preferred range for the amount of boehmite in the aqueous slurry is from about 25 grams boehmite to about 150 grams boehmite per 1000 grams water; but, the most preferred weight ratio of boehmite to water in the boehmite slurry is in the range of from 50 grams boehmite to 100 grams boehmite per 1000 grams water.

The boehmite material is dispersed in the solvent by adding an acid or acidifying agent to acidify the slurry and to form the acidified slurry of boehmite. Any acid can be utilized to form the acidified slurry of boehmite that suitably gives a slurry with the desired properties. It is preferred, however, that the acid be selected from the group consisting of nitric acid, sulfuric acid, hydrochloric acid, acetic acid and mixtures of two or more thereof. The most preferred acid for use as an acidifying agent is nitric acid ($HNO_3$). The amount of acid employed in acidifying the mixture of boehmite and solvent can be any amount suitable for and effective in dispersing the boehmite in the solution and can range from about 1 gram concentrated acid to about 50 grams concentrated acid per 1000 grams of solvent.

Upon the preparation of the acidified slurry of boehmite, a silicate solution is added to the slurry and mixed sufficiently to provide a homogeneous mixture. The silicate solution used in forming the homogeneous mixture is preferably a solution of sodium silicate and water. The sodium silicate solution is prepared by acidifying a dilute aqueous mixture of sodium silicate with any suitable acid that will cause a solution, but not a gel, to be formed. The aqueous mixture of sodium silicate will generally comprise from about 1 gram sodium silicate to about 80 grams sodium silicate per 100 grams water. Preferably, the aqueous mixture of sodium silicate will have from about 10 grams sodium silicate to about 70 grams sodium silicate per 100 grams water; but, most preferably, the weight ratio of sodium silicate per water in the aqueous mixture of sodium silicate is from 20 to 60. It is preferred that the agent used to acidify the aqueous mixture of sodium silicate to form the silicate solution be an acid selected from the group consisting of nitric acid, sulfuric acid, hydrochloric acid, acetic acid and mixtures of two or more thereof. The most preferred acidifying agent or acid, however, is nitric acid ($HNO_3$). The amount of acid employed in acidifying the aqueous mixture of sodium silicate can be any suitable amount necessary to form the solution; but, preferably, it is an amount such as to give a solution having a pH in the range of from about 1 to about 3. Most preferably, the amount of acid utilized will be that amount necessary to provide a silicate solution pH of from 1.5 to 2.0.

Any suitable method known in the art can be used to suitably mix the acidified slurry of boehmite and the silicate solution to form a homogenized mixture or mixture. The mixing or blending time can range upwardly to 60 minutes, but it is generally less than 60 minutes. Preferably, the mixing time will be in the range of from about 2 minutes to about 30 minutes. Upon the preparation of the homogenized mixture, a base compound is added to the mixture which is suitable for inducing the formation of a gel material comprising silicated alumina. Examples of base compounds suitable for inducing the formation of the gel include, but are not limited to, alkali metal hydroxides, ammonium hydroxide, ammonia, and urea. Ammonium hydroxide is the preferred base compound.

The gel or silicated alumina gel is recovered by any suitable means known in the art such as, for example, filtration, and thereafter washed to remove sodium ions and other surface impurities or contaminants. The washed silicated alumina gel is then dried to remove water by any suitable means known in the art. Spray drying methods are among the suitable drying methods that can be used to dry the washed gel. Examples of such suitable spray drying methods and apparatuses are listed and described in *Perry's Chemical Engineers Handbook, Sixth Edition*, Edited by D. W. Green (McGraw-Hill, 1984) at pp. 20-54 through 20-58.

Generally, the catalytic promoter contains silica in an amount up to about 75 weight percent of the total weight of the silicated alumina gel and perhaps greater than 75 weight percent depending upon the type and physical properties of alumina used in the preparation of the silicated alumina. However, the preferred amount of silica contained in the silicated alumina gel substrate is in the range of from about 10 weight percent to about 75 weight percent of the silicated alumina gel. Most preferably, the amount of silica contained in the silicated alumina gel substrate can range from about 15 weight percent to about 66 weight percent.

The silicated alumina gel prepared by the method described herein typically will have pore sizes in the range of about 300–800 Angstroms, pore volumes in the range of about 0.4 to 1.25 cc/gram and surface areas in the range of about 200 to 350 $m^2$/gram. The value representing "pore volume", as referred to herein, is determined by the method of mercury intrusion porosimetry as described by the ASTM method D4284-88 entitled "Standard Test Method for Determining Pore Volume Distribution of Catalysts by Mercury Intrusion Porosimetry". The values provided herein for surface area are determined by the ASTM Method D3663-84 entitled "Standard Test Method for Surface Area of Catalysts".

Further suitable examples of catalytic promoters (which are sometimes referred to as catalyst supports) can be found in U.S. Pat. Nos. 3,887,494; 3,900,457; 4,081,407; 4,119,569; 4,151,122; 4,177,162; 4,294,724; 4,296,001; 4,345,055; 4,364,839; 4,364,841; 4,364,842; 4,364,854; 4,364,855; 4,392,990; 4,397,765; 4,402,864; 4,405,501; 4,735,931; 4,981,831; and 5,073,911; the entire disclosures of which are hereby incorporated by reference.

Generally, the amount of catalytic promoter to use, based on a weight ratio to nickel, is from about 0.001 to about 100,000. However, it is preferred that a weight ratio of about 0.01 to about 10,000 be used; and it is most preferred that a weight ratio of catalytic promoter to nickel be from 0.1 to 1,000.

The catalytic composition (which can optionally include a catalytic promoter) can be used to oligomerize (including dimerize), co-oligomerize (including codimerize), polymerize, and copolymerize olefins. For the purposes of this specification these processes can be described and defined as processes where the catalytic compositions of this invention react with olefins. The reaction, in general, is conducted by contacting the catalytic composition with at least one olefin.

Generally oligomers, including co-oligomers have a molecular weight less than 1,000. Polymers and copolymers on the other hand can have weight average molecular weights up to the millions.

The olefins useful in this invention are those that have from 2 to about 20 carbon atoms in their molecular structure and from 1 to about 19 carbon-carbon double bonds in their molecular structure. Suitable examples include, but are not limited-to, ethylene, propylene, 1-butene, 1,3-butadiene, 3-methyl-1-butene, 1-pentene, 3-methyl-1-pentene, 4-methyl-1-pentene, 1-hexene, 3-ethyl-1-hexene, 1-octene, 1-decene, and mixtures of two or more said olefins. Presently preferred olefins are mono-1-olefins and most preferred is ethylene.

The catalytic process can be carried out in any manner known in the art. For example, the reaction temperatures can be in the range of about 0° C. to about 300° C. Preferably the reaction temperature is between about 10° C. and about 200° C. and most preferably it is in the range of 20° C. to 160° C. inclusive. Additionally, for example, the reaction pressure can be in the range of about 10 psig to about 10,000 psig. Preferably it is in the range of about 50 to about 1,000 psig and most preferably it is in the range of 100 to 600 psig. Additionally, for example, the reaction time can be in the range of about 1 minute to about 100 hours. Preferably it is in the range of about 5 minutes to about 50 hours and most preferably it is in the range of 1 to 10 hours.

Further examples of catalytic processes are found in U.S. Pat. Nos. 2,825,721; 3,152,872; 3,172,737; 3,203,766; 3,226,205; 3,242,150; 3,248,179; 3,374,211; 3,534,006; 3,620,981; 3,637,636; 3,644,564; 3,647,915; 3,661,803; 3,686,159; 3,725,306; 3,872,029; 3,904,550; 3,922,322; 3,923,692; 3,925,253; 3,957,448; 3,971,768; 3,998,995; 4,003,712; 4,011,382; 4,024,202; 4,121,029; 4,129,701; 4,134,856; 4,233,184; 4,255,542; 4,302,566; 4,364,842; 4,364,854; 4,364,855; 4,482,640; 4,487,847; 4,628,138; 4,698,403; 4,716,205; 4,720,472; 4,721,696; 4,758,330; and 4,786,714.

EXAMPLES

These examples are provided to further assist a person skilled in the art with understanding this invention. The particular reactants, conditions, and the like, are intended to be generally illustrative of this invention and are not meant to be construed as unduly limiting the reasonable scope of this invention.

In each run in Table-S, bis(1,5-cyclooctadiene) nickel was contacted with the indicated cyclicazacarbyl compound. Some of these catalytic compositions had a catalytic promoter present. Each of these catalytic compositions was contacted with ethylene to form reaction products. These reactions were conducted in about a 1.6 liter stainless steel, stirred tank reactor.

Toluene (350 mL) and a catalytic promoter, if used, were added to the reactor first. These components were then briefly stirred after the tank was purged with ethylene. Subsequent to this stirring the bis(1,5-cyclooctadiene) nickel and the cyclicazacarbyl compound were added to the reactor. The chemicals in the reactor were then stirred for about 15 minutes. Ethylene was then pressured into the reactor. The ethylene pressure was then maintained at a nearly constant pressure. The reactions were then terminated by venting the excess ethylene. Any resulting solid material was then separated and recovered. In general, some of the recovered solid was washed in toluene and/or methanol and then dried and weight. Thereafter some of the characteristics of some of the solid materials were determined.

The results are presented in Table S.

TABLE S

| Run Number | Ni(COD)$_2$[1] | CAC[2] | CP[3] | RT[4] | RP[5] | RT[6] | EU[7] | P[8] | Melt Index[9] |
|---|---|---|---|---|---|---|---|---|---|
| 1 | 0.41 | A1/0.18 | — | 22.9–34.3 | 495 | 186.7 | 135 | 137 | 4.7 |
| 2 | 0.16 | A1/0.07 | B1/1.42 | 22.4–36.5 | 500 | 111.8 | 1692 | 1486 | 1.6 |
| 3 | 0.40 | A1/0.18 | B2/1.54 | 22.1–29.5 | 500 | 149.7 | 167 | 130 | 0.003 |
| 4 | 0.10 | A1/0.05 | B3/1.96 | 20.9–77.6 | 400–490 | 60.1 | 16048 | 1266 | 88 |
| 5 | 0.10 | A1/0.05 | B4/2.19 | 23.7–83.2 | 480–495 | 60.0 | — | 3700 | 115 |
| 6 | 0.11 | A2/0.04 | B4/2.86 | 22.0–55.6 | 495 | 100.0 | 27555 | 257 | — |
| 7 | 0.21 | A3/0.13 | B4/2.00 | 20.6–82.4 | 490 | 89.3 | 4877 | 455 | 33 |
| 8 | 0.19 | A4/0.96 | B5/2.11 | 22.3–49.1 | 495 | 119.8 | 3171 | 365 | 9 |
| 9 | 0.3 | A5/0.06 | B5/2.18 | 20.7–39,5 | 490 | 100.2 | 2951 | 128 | — |
| 10 | 0.09 | A6/0.06 | B5/2.17 | 24.3–55.7 | 475–490 | 66.5 | 12802 | 221 | — |
| 11 | 0.15 | A7/0.10 | B4/2.18 | 22.4–79.1 | 475–505 | 96.4 | 7531 | 82 | — |
| 12 | 0.19 | A8/0.11 | B4/2.37 | 20.5–39.3 | 490 | 118.2 | 1399 | 150 | — |
| 13 | 0.15 | A9/0.07 | B4/2.18 | 23.0–70.0 | 475–495 | 74.3 | 88039 | 1583 | 3 |

[1] This is the amount in grams of bis(1,5-cyclppctadoeme) nickel
[2] This is the type of cyclicazacarbyl compound used and the amount used. The number is the amount of CAC used in grams. The letter is the type of CAC used.
  A1: picolinic acid also known as pyridine-2-carboxylic acid
  A2: pyrrole-2-carboxylic acid
  A3: quinoline-2-carboxylic acid
  A4: pyridine-2-carboxylic acid 1-oxide
  A5: pyridine-4-carboxylic acid
  A6: pyridine-2,5-dicarboxylic acid
  A7: pyridine-2-ethanesulfonic acid
  A8: 2,2'-dipyridyl
  A9: pyrazine-2-carboxylic acid
[3] This is the type of catalytic promoter used and the amount used. The number is the amount of catalytic promoter used. The letter is the type of catalytic promoter used as indicated as follows.
  B1: A commercially available silica that had been activated at 600° C.
  B2: A commercially available alumina activated at 700° C.
  B3: A commercially available alumina that was subsequently fluoridated at 600° C. then activated at 600° C.
  B4: An availabel alumina-phosphate activated at 700° C. and having a P/A1 molar ratio of about 0.4.
[4] This is the reaction temperature in °C.
[5] This is the approximate reaction pressure or pressure range in psig.
[6] This is the reaction time in minutes.
[7] This is the ethylene uptake in grams of ethylene used per gram of nickel per hour.
[8] This is the productivity for producing polymer in grams of polymer per gram of nickel per hour.
[9] As measured in accordance with ASTM-D-1238 using a 2.16 Kg weight and a temperature of 190° C.

The above results clearly indicate the broad spectrum of compounds useful in this invention. Additionally, the results clearly indicate the broad range of polymers that can be produced. Furthermore, the results clearly indicate that the ethylene uptake (col. EU) has a broad range of useful results.

In particular, Runs 1–5, and 9–11 illustrate cyclicazacarbyl compounds having general formulas 2A1, 2A2, or 2A3 can be used in this invention. Runs 8, 13, 6, 7, and 12 illustrate cyclicazacarbyl compounds having general formulas 2B, 2C, 2D, 2E, and 2F respectively, can be used in this invention. Furthermore, Runs 2–13 illustrate the different catalytic promoters that can be used in this invention. These runs also illustrate the different polymer compositions that can be produced. For example, compare the melt index of Run five to the melt index of Run three. Additionally, columns EU and P indicate that other ethylene products are being formed such as dimers, trimers and oligomers.

That which is claimed is:

1. A catalytic composition produced by the process comprising contacting an organonickel compound, wherein the nickel is in the zero valence state or able to be reduced to the zero valence state and the organic component is unsaturated, with a cyclicazacarbyl compound.

2. A catalytic composition according to claim 1 wherein said organic component has from about two to about five carbon-carbon double bonds.

3. A catalytic composition according to claim 1 wherein said organic component has from three to four carbon-carbon double bonds.

4. A catalytic composition according to claim 1 wherein said organonickel compound is selected from the group consisting of cyclododecatriene nickel, triethylene nickel, bis(1,5-cyclooctadiene) nickel, and mixtures of two or more said organonickel compounds.

5. A catalytic composition according to claim 1 wherein said organonickel compound is bis(1,5-cyclooctadiene)nickel.

6. A catalytic composition according to claim 1 wherein said cyclicazacarbyl compound has one of the following structures:

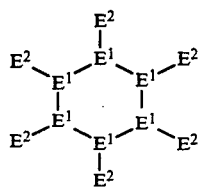

Structure 1A

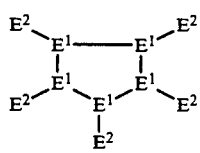

Structure 1B wherein $E^1$ is carbon or nitrogen, provided that at least one $E^1$ in at least one ring is nitrogen; and wherein at least one $E^2$ is selected from the group consisting of $-R^1(OH)_x$, $-R^1(COOH)_x$, $-R^1(SOH)_x$, $-R^1(SOOH)_x$, $-R^1(SO_2OH)_x$,

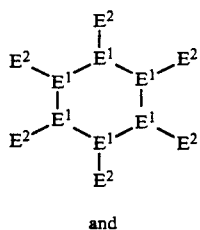

and

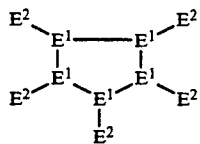

wherein $R^1$ is a hydrocarbyl or heterohydrocarbyl, and wherein x is an integer greater than zero, the remaining $E^2$ groups being selected from the group consisting of hydrocarbyls and heterohydrocarbyls.

7. A catalytic composition according to claim 1 wherein said cyclicazacarbyl compound is selected from the group consisting of pyridine compounds, pyrazine compounds, pyrimidine compounds, pyridazine compounds, pyrrole compounds, and mixtures of two or more said cyclicazacarbyl compounds.

8. A catalytic composition according to claim 1 wherein said cyclicazacarbyl compound is selected from the group consisting of pyridine-2-carboxylic acid, pyridine-3-carboxylic acid, pyridine-4-carboxylic acid, pyridine-2,3-dicarboxylic acid, pyridine-2,4-dicarboxylic acid, pyridine-2,5-dicarboxylic acid, pyridine-2,6-dicarboxylic acid, pyridine-3,4-dicarboxylic acid, pyridine-3,5-dicarboxylic acid, pyridine-2-ethylsulfonic acid, pyridine-2-carboxylic acid 1-oxide, pyrazine-2-carboxylic acid, pyrrole-2-carboxylic acid, quinoline-2-carboxylic acid, 2,2'dipyridyl, and mixtures of two or more said cyclicazacarbyl compounds.

9. A catalytic composition according to claim 1 wherein said cyclicazacarbyl compound is pyridine-2-carboxylic acid.

10. A catalytic composition according to claim 1 wherein the molar ratio of cyclicazacarbyl compound to nickel is from about 0.001 to about 100,000.

11. A catalytic composition produced by the process comprising contacting an organonickel compound, wherein the nickel is in the zero valence state or able to be reduced to the zero valence state and the organic component is unsaturated, with a cyclicazacarbyl compound, wherein said cyclicazacarbyl compound does not have a monocyclic/monoaza/pentacarbyl structure of the formula

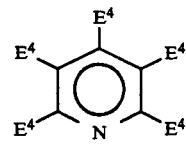

wherein each $E^4$ is independently selected from the group consisting of hydrogen, alkyl, and (—COOH), provided that at least one $E^4$ is (—COOH).

12. A catalytic composition according to claim 11 wherein said organic component has from about two to about five carbon-carbon double bonds.

13. A catalytic composition according to claim 11 wherein said organic component has from three to four carbon-carbon double bonds.

14. A catalytic composition according to claim 11 wherein said organonickel compound is selected from the group consisting of cyclododecatriene nickel, triethylene nickel, bis(1,5-cyclooctadiene) nickel, and mixtures of two or more said organonickel compounds.

15. A catalytic composition according to claim 11 wherein said organonickel compound is bis(1,5-cyclooctadiene)nickel.

16. A catalytic composition according to claim 11 wherein said cyclicazacarbyl compound is selected from the group consisting of pyrazine compounds, pyrimidine compounds, pyridazine compounds, pyrrole compounds, and mixtures of two or more said cyclicazacarbyl compounds.

17. A catalytic composition according to claim 11 wherein said cyclicazacarbyl compound is selected from the group consisting of pyridine-2-ethylsulfonic acid, pyridine-2-carboxylic acid 1-oxide, pyrazine-2-carboxylic acid, pyrrole-2-carboxylic acid, quinoline-2-carboxylic acid, 2,2'dipyridyl, and mixtures of two or more said cyclicazacarbyl compounds.

18. A catalytic composition according to claim 11 wherein the molar ratio of cyclicazacarbyl compound to nickel is from about 0.001 to about 100,000.

19. A catalytic composition according to claim 11 wherein said contacting is conducted in the presence of a catalytic promoter selected from the consisting of silica, silica-titania, clay, alumina, fluoridated alumina, silicated alumina, aluminum phosphate, and mixtures of two or more said catalytic promoters.

20. A catalytic composition according to claim 19 wherein said catalytic promoter is a clay compound selected from the group consisting of aluminum silicates, magnesium silicates, aluminum-magnesium silicates, and mixtures of two or more said clay compounds.

21. A catalytic composition according to claim 19 wherein said catalytic promoter is a clay compound selected from the group consisting of attapulgite, bentonite, halloysite, hectorite, kaolinire, montmorillonite, pyrophylite, sepiolite, talc, vermiculite, and mixtures of two or more said clay compounds.

22. A catalytic composition according to claim 19 wherein said catalytic promoter is sepiolite.

23. A catalytic composition according to claim 19 wherein said catalytic promoter is bentonite.

24. A catalytic composition according to claim 19 wherein said catalytic promoter is aluminum phosphate.

* * * * *

UNITED STATES PATENT AND TRADEMARK OFFICE
CERTIFICATE OF CORRECTION

PATENT NO. : 5,332,708
DATED : July 26, 1994
INVENTOR(S) : Ronald D. Knudsen et al It is certified that error appears in the above-indentified patent and that said Letters Patent is hereby corrected as shown below:

Column 14, line 67, before the word "consisting" and after the word "the" the following word should be inserted ---group---.

Column 16, line 1, the word "kaolinire" should be ---kaolinite---.

Signed and Sealed this

Eighth Day of November, 1994

Attest:

BRUCE LEHMAN

*Attesting Officer*    Commissioner of Patents and Trademarks